(12) United States Patent  (10) Patent No.: US 9,035,943 B1
Han et al.  (45) Date of Patent: May 19, 2015

(54) MULTI-VIEW IMAGE DISPLAY APPARATUS AND MULTI-VIEW IMAGE DISPLAY METHOD THEREOF

(71) Applicant: SAMSUNG ELECTRONICS CO., LTD., Suwon-si (KR)

(72) Inventors: Seung-ryong Han, Jeonju-si (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/255,633

(22) Filed: Apr. 17, 2014

(30) Foreign Application Priority Data

Nov. 13, 2013 (KR) .......................... 10-2013-0137522

(51) Int. Cl.
```
G06T 15/00      (2011.01)
G06T 19/20      (2011.01)
H04N 13/00      (2006.01)
```
(52) U.S. Cl.
CPC ................. *G06T 19/20* (2013.01); *G06T 15/00* (2013.01); *H04N 13/0022* (2013.01)

(58) Field of Classification Search
CPC ........... G02B 27/2214; H04N 13/0022; H04N 13/0402–13/042
USPC .................................................. 345/419, 422
See application file for complete search history.

(56) References Cited

U.S. PATENT DOCUMENTS

| | | | |
|---|---|---|---|
| 2003/0048354 A1* | 3/2003 | Takemoto et al. | 348/51 |
| 2011/0081042 A1* | 4/2011 | Kim et al. | 382/100 |
| 2012/0038641 A1* | 2/2012 | Levantovsky | 345/424 |
| 2012/0327077 A1* | 12/2012 | Tung | 345/419 |

* cited by examiner

*Primary Examiner* — Charles Tseng
(74) *Attorney, Agent, or Firm* — Sughrue Mion, PLLC

(57) ABSTRACT

A multi-view image display apparatus is disclosed. The multi-view image display apparatus includes a depth adjuster configured to adjust depth of an input image, a rendering unit configured to perform rendering of a multi-view based on the depth-adjusted image, a display configured to arrange and display the multi-view image according to an arrangement pattern, and a controller configured to control the depth adjuster to shift depth of the input image so that an object satisfying a criterion has a depth value, based on depth information of at least one object included in the input image.

18 Claims, 19 Drawing Sheets

ENTIRE IMAGE

FOREGROUND IMAGE

REAR GROUND IMAGE

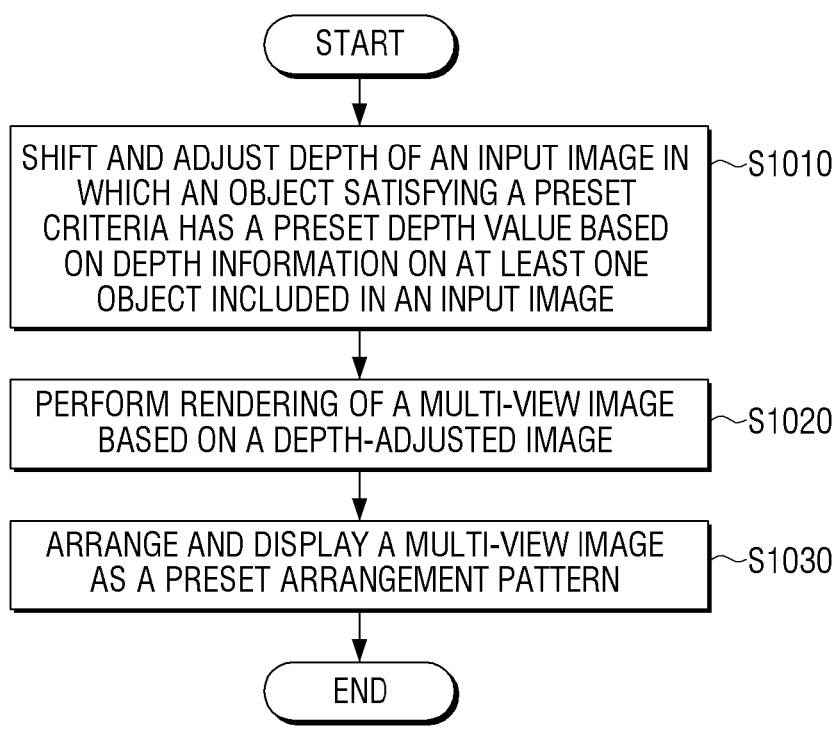

MULTI-VIEW IMAGE DISPLAY APPARATUS AND MULTI-VIEW IMAGE DISPLAY METHOD THEREOF

CROSS-REFERENCE TO RELATED APPLICATION

This application claims priority from Korean Patent Application No. 10-2013-0137522 filed on Nov. 13, 2013 in the Korean Intellectual Property Office, the disclosure of which is incorporated herein by reference in its entirety.

BACKGROUND

1. Field

Apparatuses and methods consistent with exemplary embodiments relate to a multi-view image display apparatus and a controlling method thereof, and more particularly to a glasses-free multi-view image display apparatus and a method for displaying a multi-view image.

2. Description of the Related Art

Advancement in electronic technologies has enabled development and distribution of various types of electronic devices. In particular, a display apparatus such as a TV which is one of the most frequently used home appliances has experienced significant development in recent years.

While functions of a display apparatus have advanced, types of contents displayed by a display apparatus have also increased. In particular, a 3D display system which enables viewing of 3D contents has been developed and distributed recently.

Meanwhile, 3D display apparatuses may be divided into a glasses type system (in which the viewers where glasses) and a glasses-free system according to whether glasses are used for watching a 3D image.

An example of a glasses type system is a shutter glass display apparatus. In the shutter glass scheme, left-eye and right-eye images are output alternately and left and right shutter glasses of 3D glasses worn by the viewer are open or closed alternately in conjunction with output of left-eye and right-eye images so that the viewer can feel a cubic effect.

A glasses-free system is also referred to as an autostereoscopic system. A glasses-free 3D display apparatus displays optically separated multi-view images and transmits light corresponding to images of different view to the viewer's left and right eyes using parallax barriers or lenticular lenses so that the viewer can feel a cubic effect.

Meanwhile, when a glasses-free system has N optical views, N multi-view images may be generated and provided through rendering of the input images. The generated N multi-view images, through view mapping technologies, are converted to be displayed. In accordance with view mapping methods, there exists a linear mapping method and a cyclic mapping method.

FIGS. 1A and 1B are views provided to explain the display operations of a multi-view image according to the linear mapping method.

The linear mapping method, which matches a multi-view image of the $1^{st}$ to $7^{th}$ view to an optical view in the order of view $1^{st}$, $2^{nd}$, $3^{rd}$, $4^{th}$, $5^{th}$, $6^{th}$, $7^{th}$, $1^{st}$, $2^{nd}$, and $3^{rd}$ . . . , has a problem as shown in FIGS. 1A and 1B that a dead zone may occur according to a viewing position. Herein, the dead zone indicates a position where a viewing position of the viewer changes from the $7^{th}$ view to the $1^{st}$ view. At this position, serious crosstalk may occur due to a drastic change in disparity (e.g., jumping phenomenon), and a 3D image cannot be viewed. Also, a user may have visual fatigue. That is, as illustrated in FIGS. 1A and 1B, a position where an image of $7^{th}$ view and $1^{st}$ view are concurrently viewed corresponds to the dead zone.

The cyclic mapping method is a method of arranging views in an order of $1^{st}$, $2^{nd}$, $3^{rd}$, $4^{th}$, $3^{rd}$, $2^{nd}$, and $1^{st}$ view, which has a merit to reduce a drastic change in disparity that occurs in the linear mapping method. However, at a section of pseudo stereo where a view is placed in reverse order, left and right images viewed by both eyes of a viewer are changed to right and left images, thereby making a viewer feel visual fatigue, particularly, a swim effect.

SUMMARY

An aspect of the exemplary embodiments is designed in accordance with the above-described necessities and is purposed to provide a multi-view image display apparatus and a method for displaying a multi-view image which may reduce swim effect of a screen.

According to an exemplary embodiment, a multi-view image display apparatus includes a depth adjuster configured to adjust depth of an input image, a rendering unit configured to perform rendering of a multi-view based on the depth-adjusted image, a display configured to arrange and display the multi-view image according to an arrangement pattern, and a controller configured to control the depth adjuster to shift depth of the input image so that an object satisfying a criterion has a depth value, based on depth information of at least one object included in the input image.

Herein, the depth value may be a depth value corresponding to a focal plane in a depth map.

The controller may determine the object satisfying the criterion based on a depth value of the at least one object included in the input image and a size of a pixel region which the object occupies.

The controller may shift depth of the input image so that an object, from among the at least one object, having a greater pixel size is arranged on the focal plane by comparing a first pixel size of a rear ground object having a first depth value less than the depth value with a second pixel size of a foreground image having a second depth value greater than the depth value.

The controller, when a first pixel size of a rear ground object, from among the at least one object, having a first depth value less than the depth value is the same as a pixel size of a foreground image having a second depth value greater than the depth value, may shift depth of the input image so that the rear ground object is arranged on the focal plane.

When the depth of the input image is shifted so that a specific object has a depth value, the controller may determine an object in which swim effect is minimized at a section where a multi-view image is arranged in reverse order of the arrangement pattern, and where pseudo stereo occurs, as an object satisfying the criterion.

When the multi-view image is a total of N views, the arrangement pattern may be a repeat of a pattern where 1st view to N/2th view are arranged sequentially and then N/2–1th view to 1st view are arranged in reverse order, or a repeat of a pattern where one view from among odd views and even views of 1st view to Nth view is arranged sequentially and then the other remaining view from among odd views and even views of Nth view to 1st view is arranged in reverse order.

The apparatus further includes a storage configured to store information on each depth section providing a viewer with a same cubic effect, wherein the controller, based on the stored information, may adjust the depth of the at least one object included in the input image to a depth value close to the focal plane at a depth section providing a same cubic effect as the at least one object.

Meanwhile, a method for displaying a multi-view image according to an exemplary embodiment comprises adjusting depth by shifting depth of an input image so that an object satisfying a criterion has a depth value, based on depth information of at least one object included in the input image, performing rendering of a multi-view image based on the depth-adjusted image, and arranging and displaying the multi-view image as an arrangement pattern.

Herein, the depth value may be a preset depth value corresponding to a focal plane in a depth map.

The adjusting the depth may determine the object satisfying the criterion based on a depth value of the at least one object included in the input image and a size of a pixel region which the object occupies.

The adjusting depth may include, from among the at least one object, shifting depth of the input image so that an object having a greater pixel size is arranged on the focal plane, by comparing a first pixel size of a rear ground object having a first depth value less than the depth value with a second pixel size of a foreground image having a second depth value greater than the depth value.

The adjusting depth may include, when a first pixel size of a rear ground object, from among the at least one object, having a first depth value less than the preset depth value is the same as a second pixel size of a foreground image having a second depth value greater than the preset depth value, shifting depth of the input image so that the rear ground object is arranged on the focal plane.

The adjusting the depth may include, when depth of the input image is shifted so that a specific object has a depth value, determining an object in which swim effect is minimized at a section where a multi-view image is arranged in reverse order at the arrangement pattern and where pseudo stereo occurs, as an object satisfying the preset criterion.

When the multi-view image is a total of N views, the arrangement pattern may be a repeat of a pattern where 1st view to N/2th view are arranged sequentially and then N/2−1th view to $1^{st}$ view are arranged in reverse order, or a repeat of a pattern where one view from among odd views and even views of $1^{st}$ view to Nth view is arranged sequentially and then the other remaining view from among odd views and even views of Nth view to $1^{st}$ view is arranged in reverse order.

The method may further include storing information on each depth section providing a viewer with a same cubic effect, wherein the adjusting depth comprises, based on the stored information, adjusting a depth of the at least one object included in the input image to a depth value close to the focal plane at a depth section providing a same cubic effect as the at least one object.

The criterion and/or the arrangement pattern may be preset.

According to an exemplary embodiment, there is provided a multi-view image display apparatus. The apparatus comprises: a depth adjuster configured to adjust depth of an input image; a rendering unit configured to perform rendering of a multi-view based on the depth adjusted image; a display configured to arrange and display the multi-view image; and a controller configured to determine which one object from among a plurality of objects of the input image to shift toward a focal plane and control the depth adjuster to shift a depth of the one object and shift at least one other object from among the plurality of objects based on the shifting of the one object.

According to another exemplary embodiment, there is provided a method for displaying a multi-view image. The method comprises: adjusting depth by shifting depth of an input image; determining which one object from among a plurality of objects of the input image to shift toward a focal plane; shifting a depth of the one object and shifting at least one other object from among the plurality of objects based on the shifting of the one object; performing rendering of a multi-view image based on the depth-adjusted image; and arranging and displaying the multi-view image.

As described above, according to various exemplary embodiments, swim effect which occurs due to an arrangement pattern of a multi-view image of a glasses-free display system may be reduced.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 10 is a flow chart provided to explain a method for displaying a multi-view image according to an exemplary embodiment.

DESCRIPTION OF EXEMPLARY EMBODIMENTS

Figure 1A:
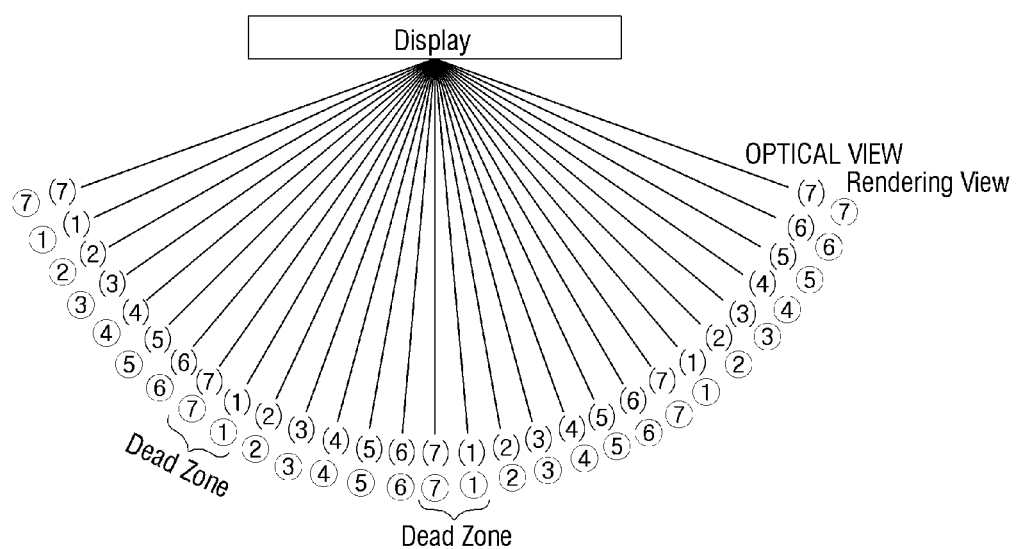
FIGS. 1A and 1B are views provided to explain the related art.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 2A:
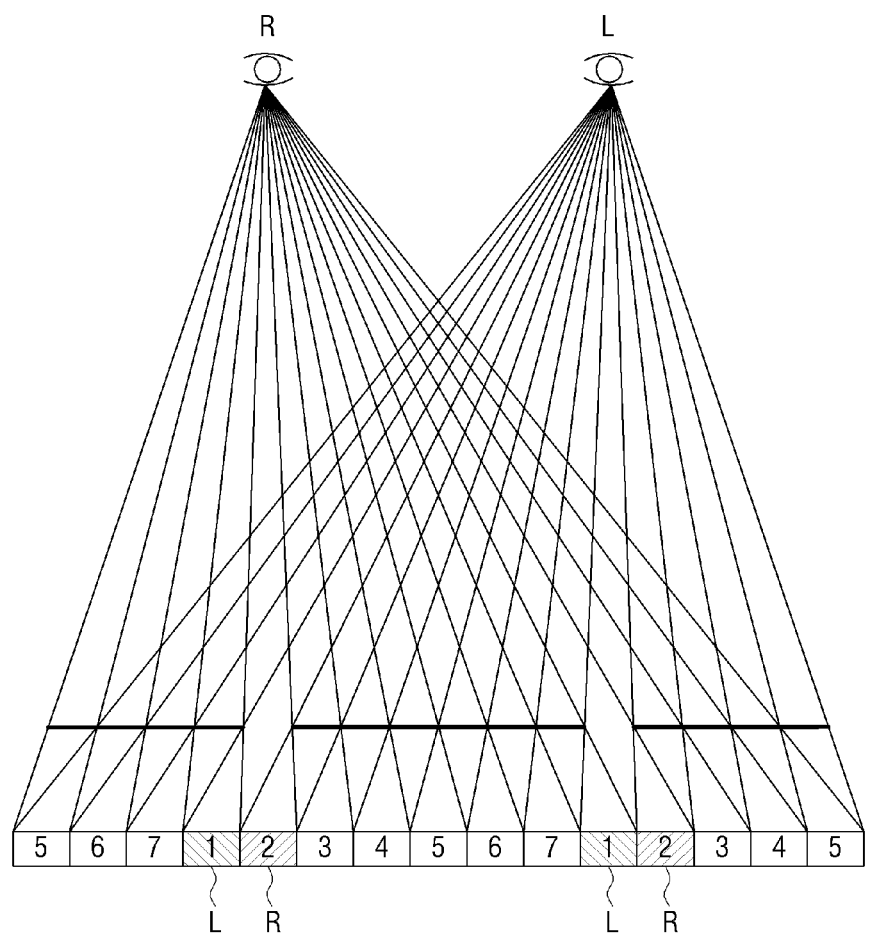
FIGS. 2A-2C are views provided to explain the operations of a glasses-free 3D display apparatus to facilitate understanding of an exemplary embodiment.
Figure 2B:
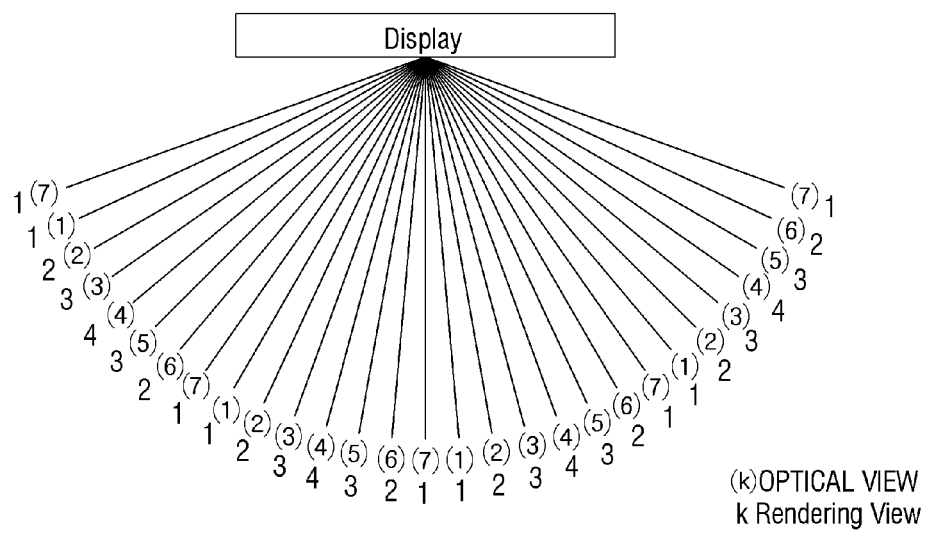
Figure 2C:
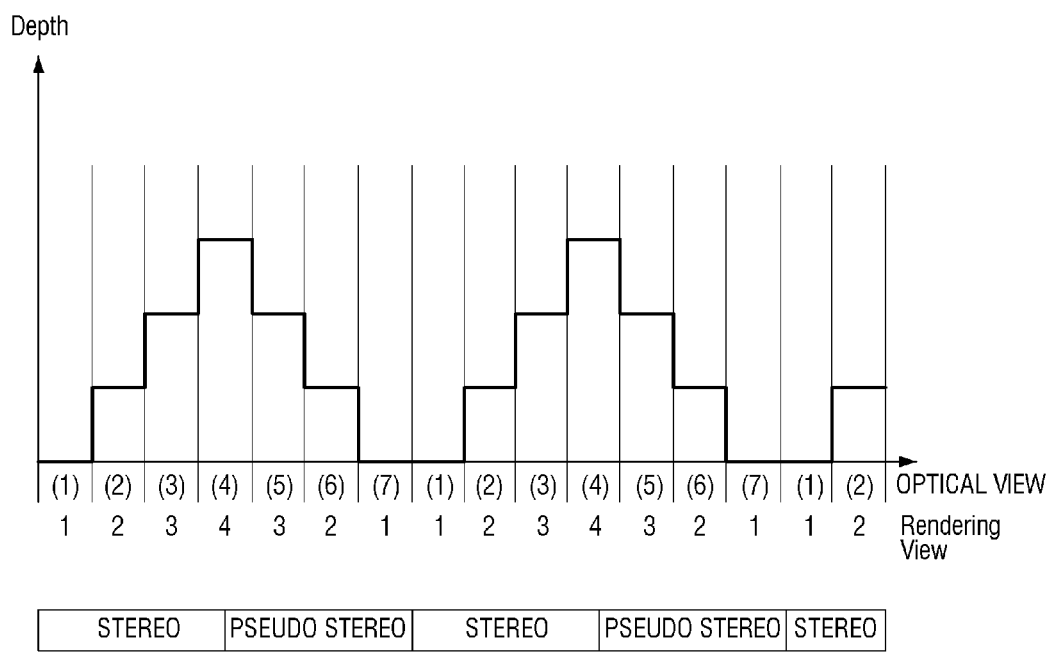

FIGS. 2A-2C are views provided to explain the operations of a glasses-free 3D display apparatus to facilitate understanding of exemplary embodiments.

FIG. 2A illustrates the operations of an apparatus which displays a multi-view image and provides a 3D image without the need to use glasses, according to an exemplary embodiment. Herein, the multi-view image includes a plurality of images which photograph the same object at different angles.

That is, a plurality of images photographed at different views are refracted at different angles, and a focused image is provided to a position (for example, approx. 3 m) which is distant for a certain distance, so-called viewing distance. The position where such image is formed is called a viewing region. Accordingly, when one eye of a user is located at a first viewing region, and the other eye is located at a second viewing region, a user may feel a cubic effect.

For example, FIG. 2A is a view explaining the display operations of a multi-view image having a total of 7 views. Referring to FIG. 2A, a glasses-free 3D display apparatus may enable that light corresponding to the $1^{st}$ view from among 7 views is transmitted in the left eye, and light corresponding to the $2^{nd}$ view is transmitted in the right eye. Accordingly, a user may view an image having different views in the right eye and the left eye, and thus may feel a cubic effect.

FIGS. 2B and 2C are views provided to explain a pattern which arranges a multi-view image according to an exemplary embodiment.

Figure 1B:
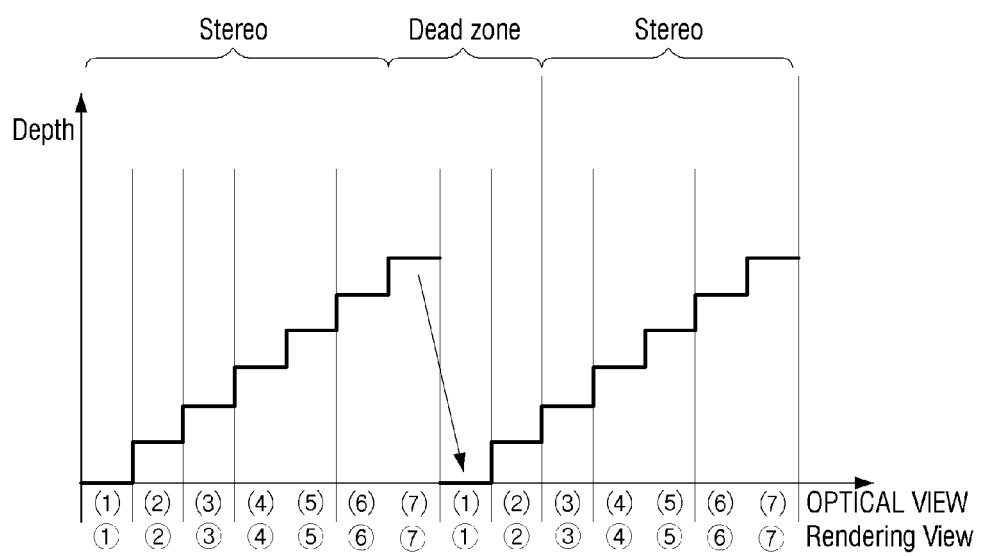

According to an exemplary embodiment, in order to solve the drawback of the linear mapping method as described in FIGS. 1A and 1B, a multi-view image may be arranged in accordance with the cyclic mapping method.

To be specific, when a multi-view image has a total of N views, the multi-view image may be a repeat of a pattern where the $1^{st}$ view to the N/2th view may be arranged sequentially, and then the N/2−1th view to the $1^{st}$ view may be arranged in reverse order. In this case, when N is an odd number, the criteria in which the view corresponding to a whole number greater than N/2 (or a whole number less than N/2) is arranged sequentially or in reverse order may be a conversion view. For example, as illustrated in FIG. 2B, a multi-view image may be arranged as a repeat of a pattern where, when a multi-view image has a total of 7 views, the $4^{th}$ view which corresponds to 4 which is a whole number greater than 7/2 is the conversion view, and accordingly, the $1^{st}$ view to the $4^{th}$ views are arranged sequentially, and then the $3^{rd}$ view to the $1^{st}$ view are arranged in reverse order.

However, the exemplary embodiments are not limited thereto, and a multi-view image may be arranged as a repeat of a pattern where one view from among odd views and even views of the $1^{st}$ view to the Nth view is arranged sequentially, and then the other view from among odd views and even views of the Nth view to the $1^{st}$ view is arranged in reverse order. For example, when a multi-view image has a total of 7 views, a multi-view image may be arranged as a repeat of a pattern where the $1^{st}$, $3^{rd}$, $5^{th}$, $7^{th}$, $6^{th}$, $4^{th}$, and $2^{nd}$ view images are repeated.

Meanwhile, when arranging a multi-view image according to the cyclic mapping method as illustrated in FIG. 2B, a pseudo stereo section where a view is arranged in reverse order occurs. For example, in FIG. 2C, the optical views 1-4 where multi-view images 1-4 are arranged sequentially correspond to a stereo section, the optical views 4-7 where multi-view images 1-4 are arranged in reverse order correspond to the pseudo stereo section. In this pseudo stereo section, there is a drawback that a swim effect occurs, but in the exemplary embodiments, depth of a multi-view image may be adjusted to reduce swim effect which occurs at the pseudo stereo section.

Hereinbelow, the configurations of an exemplary embodiment to minimize swim effect at the pseudo stereo section will be explained in further detail.

Figure 3A:
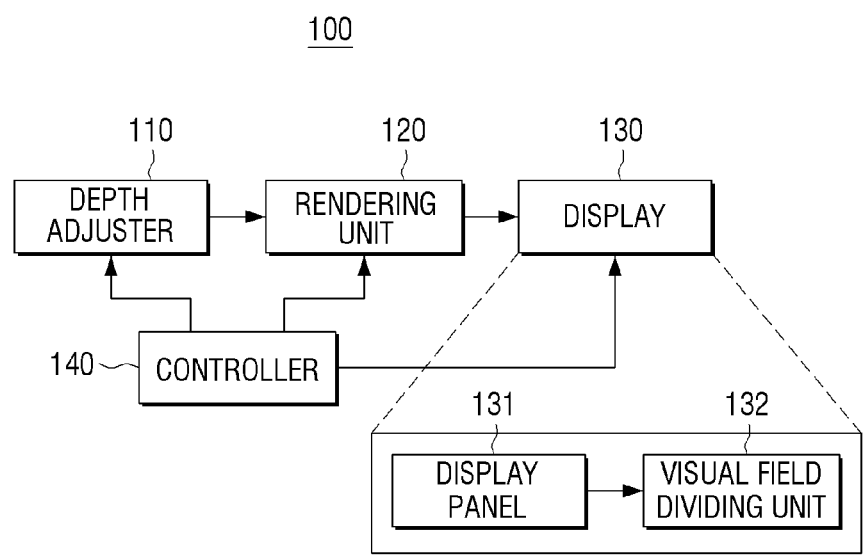
FIGS. 3A and 3B are block diagrams illustrating the configuration of a multi-view image display apparatus according to various exemplary embodiments.
Figure 3B:
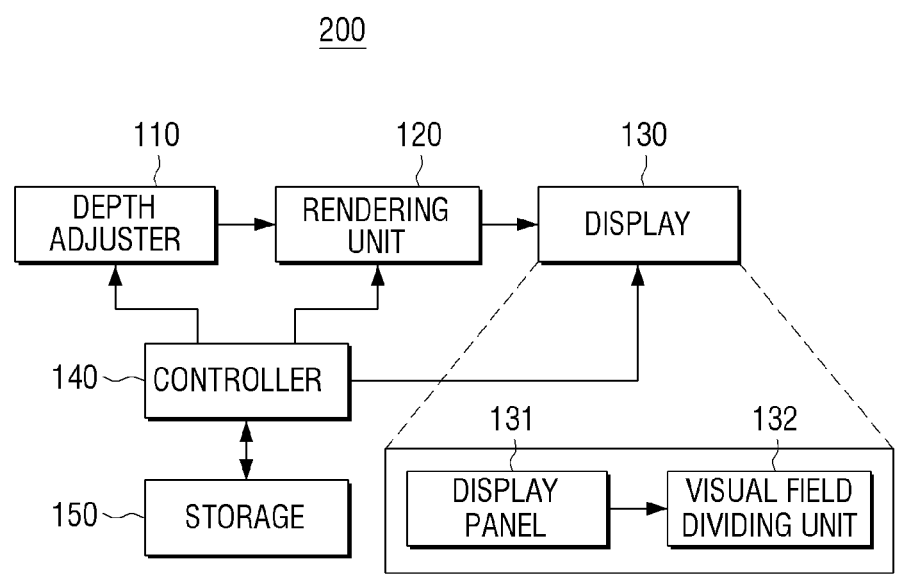

FIGS. 3A and 3B are block diagrams illustrating the configuration of a multi-view image display apparatus according to various exemplary embodiments.

FIG. 3A is a block diagram illustrating the configuration of a multi-view image display apparatus according to an exemplary embodiment.

According to FIG. 3A, a multi-view image display apparatus 100 includes a depth adjuster 110, a rendering unit 120, a display 130, and a controller 140.

The multi-view image display apparatus 100 may be implemented as various types of display apparatuses such as a TV, a monitor, a PC, a kiosk, a tablet PC, an electronic frame, a mobile phone, or the like.

The image input unit (not illustrated) receives an image and depth information. More specifically, the image input unit may receive an image and depth information of the image from different types of external devices such as an external storage medium, a broadcasting station, a web server, or the like. Herein, the input image may be one of a single-view image, a stereoscopic image, and a multi-view image. The single-view image is an image photographed by a general photographing device. The stereoscopic image is a 3D video image expressed only in left and right images, which are cubic images taken by a stereoscopic photographing device. In general, a stereoscopic photographing device is a photographing device having two lenses, which are used to photograph a cubic image. The multi-view image is a 3D video image which provides the viewer with different views of multiple directions by geometrically correcting images taken by one or more photographing devices and spatially composing the images.

In addition, the image input unit may receive depth information of an image. In general, the depth information is the depth attributed to each pixel of the image. For example, depth information of 8 bits may have gray scale values ranging from 0 to 255. For example, when white/black are criteria, black (low value) may indicate a position distant from a viewer, and white (high value) may indicate a position close to a viewer.

Depth information indicates depth of a 3D image, which corresponds to a degree of binocular disparity between a left-eye image and a right-eye image composing a 3D image. Degree of cubic effect a person may feel is different in accordance with depth information. That is, when depth is great, binocular disparity between the left-eye and the right-eye is great, and thus a user may feel a comparatively greater cubic effect, and when depth is shallow, binocular disparity between the left-eye and the right-eye is small, and thus a user may feel a comparatively lower cubic effect. In general, depth information may be obtained in a passive way by using 2-dimensional feature of an image such as stereo matching or in an active way by using equipment such as a depth camera. Depth information may be in a format of a depth map.

A depth map indicates a table which includes depth information of each region of an image. The region may be divided in pixel units or defined as a preset region which is larger than a pixel unit. For example, a depth map may indicate that within grayscale values of 0-255, a reference value of 127 or 128 may correspond to the focal plane for that depth map; a value less than 127 or 128 may be a "−" value, and a value greater than 127 or 128 may be a "+" value. Further, according to another exemplary embodiment, a reference value of focal plane may be arbitrarily selected from among grayscale values 0-255. Also, a '− value' indicates sedimentation, while '+ value' indicates protrusion.

The depth adjuster 110 adjusts depth of an input image based on depth information. To be specific, the depth adjuster 110 may adjust depth of an image so that swim effect that can occur at the pseudo stereo section according to the aforementioned cyclic mapping method can be minimized. This will be explained in further detail below while explaining the controller 140.

The rendering unit 120 may perform rendering of a multi-view image by using a depth-adjusted image by the depth adjuster 110.

To be specific, the rendering unit 120, with respect to a 2D image, may perform rendering of a multi-view image based on depth information extracted for 2D/3D conversion. Or, the rendering unit 120, when multi views, that is, N views and N depth information corresponding thereto, are input, may perform rendering of a multi-view image based on at least one view and depth information, from among the input N views and depth information. Or, the rendering unit 120, when N views are input only, after extracting depth information from N views, may perform rendering of a multi-view image based on extracted depth information.

For example, the rendering unit 120, by selecting a 3D image, that is, one of a left-eye image and a right-eye image, as a reference view (or a center view), may generate the leftmost view and the rightmost view which are the basis of a multi-view image. In this case, the rendering unit 130, based on adjusted depth information corresponding to one of a left-eye image and a right-eye image selected as a reference view, may generate a leftmost view and a rightmost view.

The rendering unit 120, when the leftmost view and the rightmost view are generated, may perform rendering of a multi-view image by generating a plurality of interpolation views between the center view and the leftmost view, and generating a plurality of interpolation views between the center view and the rightmost view. However, the embodiments are not limited thereto, and it is also possible to generate the extrapolation view generated using the extrapolation method. Meanwhile, in the case of rendering a multi-view image based on a 2D image and depth information, the 2D image may be selected as the center view.

Meanwhile, the rendering unit 120, before performing rendering of a multi-view image, may compensate the leftmost view and the rightmost view by performing hole filling work for the leftmost view and the rightmost view.

In addition, the rendering unit 120, with respect to a hole region of each multi-view image generated based on the center view, the leftmost view, and the rightmost view, may copy a value of a pixel region corresponding to one of the leftmost view and the rightmost view, and perform inpainting of the hole region. In this case, the hole filling may be performed from a part which is closer to background. For example, in case of performing rendering of a total of 35 multi-view images, for $18^{th}$ to $34^{th}$ views which exist between the center view located in the $17^{th}$ position and the rightmost view in the $35^{th}$ position, a value of a pixel region corresponding to the $35^{th}$ view which is the rightmost view may be subject to hole filling.

Meanwhile, in some cases, hole filling may be performed for each multi-view image based on an input image.

Meanwhile, the aforementioned operations of the rendering unit 120 are merely exemplary, and the rendering unit 120 may also perform rendering of a multi-view image based on the various methods other than the aforementioned operations.

The display 130 plays a function to provide a multi view (or a multi optical view). To do this, the display 130 includes a display panel 131 to provide a multi-view and a visual field dividing unit 132.

The display panel 131 includes a plurality of panels composed of a plurality of sub pixels. Herein, the sub pixels may be composed of R (Red), G (Green), and B (Blue). In other words, a pixel composed of R, G, B sub pixels may be arranged in a direction of a plurality of rows and columns and may compose a display panel 131. In this case, the display panel 131 may be realized as various display units such as a Liquid Crystal Display Panel (LCD Panel), Plasma Display Panel (PDP), Organic Light Emitting Diode (OLED), Vacuum Fluorescent Display (VFD), Field Emission Display (FED), and Electro Luminescence Display (ELD).

The display panel 131 displays an image frame. To be specific, the display panel 131 may display an image frame where a plurality of images having different views are repeated and sequentially arranged.

Meanwhile, though not illustrated in FIG. 3A, when the display panel 131 is realized as an LCD panel, the display apparatus 100, according to a pixel value of each pixel composing a backlight unit (not illustrated) providing backlight to the display panel 131 and an image frame, may further include a panel driving unit (not illustrated) which drives pixels of the display panel 131.

The visual field dividing unit 132, located on a front side of the display panel 131, may provide views different by viewing regions, that is, a multi view. In this case, the visual field dividing unit 132 may be realized as a lenticular lens or a parallax barrier.

For example, the visual field dividing unit 132 may be realized as a lenticular lens including a plurality of lens regions. Accordingly, a lenticular lens may refract an image displayed in the display panel 131 through a plurality of lens regions. Each lens region may be formed of a size corresponding to at least one pixel and may disperse light, which penetrates each pixel, differently by viewing regions.

As another example, the visual field dividing unit 132 may be realized as a parallax barrier. The parallax barrier is realized as a transparent slit array including a plurality of barrier regions. Accordingly, by blocking light through a slit between barrier regions, an image having different views by viewing regions may be emitted.

Meanwhile, the visual field dividing unit 132 may be operated by being tilted at a certain angle to improve image quality. The controller 140 may divide each of a multi-view image based on the tilted angle of the visual field dividing unit 132 and generate an image frame by combining them. Accordingly, a user is able to view a displayed image having a certain tilt at a sub pixel, instead of viewing a displayed image in a vertical or horizontal direction at a sub pixel of the display panel 131.

The controller 140 may control the depth adjuster 110 to shift depth of an image so that an object satisfying a preset criterion based on depth information on at least one object included in an input image may have a preset depth value.

Herein, the preset depth value may be a depth value in a depth map corresponding to a focal plane.

In this case, the controller 140 may, when shifting depth of an image where a certain object has a preset depth value, determine an object which minimizes swim effect at a section (referring to FIGS. 2B and 2B) where pseudo stereo occurs, as an object satisfying a preset criterion. The image may be a multi view image arranged in reverse order according to a preset arrangement pattern.

Moreover, the controller 140, based on a depth value of at least one object included in an input image and size of a pixel region which an object occupies, may determine an object satisfying a preset criterion.

In this case, the controller 140 may shift depth of the input image so that an object having a greater pixel size is arranged on the focal plane by comparing a pixel size of a rear ground object having a depth value less than the preset depth value with a pixel size of a foreground image having a depth value greater than the preset depth value.

Specifically, the controller 140, from among an object included in an input image, may shift depth of the input image so that an object having a greater sum of pixel size is arranged on the focal plane by comparing a sum of a pixel region of a foreground object having a depth value greater than the preset depth value with a sum of pixel size of a rear ground object having a depth value less than the preset depth value.

For example, the controller 140, when a sum of a pixel size of a foreground object is greater than a sum of a pixel size of a rear ground object, may shift depth of an input image so that one of the foreground objects is arranged on a focal plane, and when a sum of a pixel size of a foreground object is less than a sum of a pixel size of a rear ground object, may shift depth of an input image so that one of the rear ground objects is arranged on a focal plane.

In addition, when a sum of pixel size of a rear ground object having a depth value less than the preset depth value is the same as a sum of pixel size of a foreground image having a depth value greater than the preset depth value, the controller 140 may shift depth of the input image, that is, depth of each object included in an input image, so that one of the rear ground object is arranged on the focal plane.

A detailed method for adjusting depth of the aforementioned input image will be described in further detail with reference to drawings.

FIG. 3B is a block diagram illustrating the configuration of a multi-view image apparatus according to another exemplary embodiment.

According to FIG. 3B, the multi-view image display apparatus 200 includes the depth adjuster 110, the rendering unit 120, the display 130, the controller 140, and the storage 150. In FIG. 2B, the configurations of the depth adjuster 110, the rendering unit 120, and the display 130 are the same as the configurations of FIG. 2B, and thus detailed explanation will be omitted.

The storage 150 stores information (JNDD:Just Noticeable Difference in Depth) on each depth section which provides the same cubic effect to a viewer. For example, if the depth of 8 bits has 0-255 grayscale values, each of the 0-255 values is not perceived as producing different cubic effects to a viewer; instead, a value within a certain range may be perceived as the same depth. For example, a depth value among 0-4 sections may provide a viewer with the same cubic effect, and a depth value among 5-8 sections may provide a viewer with the same cubic effect. Herein, information on each depth section which provides a viewer with the same cubic effect can be obtained through an experiment.

The controller 140, based on information stored in the storage 150, may adjust depth of at least one object included in an input image as a depth value close to the focal plane at a depth section which provides the same cubic effect as at least one object. For example, when 127 is set as a focal plane, and values of 127-131 and 132-136 sections provide a viewer with the same cubic effect, depth of an object having a depth value of 130 may be adjusted to 127, and depth of an object having a depth value of 135 may be adjusted to 132. Accordingly, swim effect may be reduced while providing a viewer with the same cubic effect.

Figure 4:
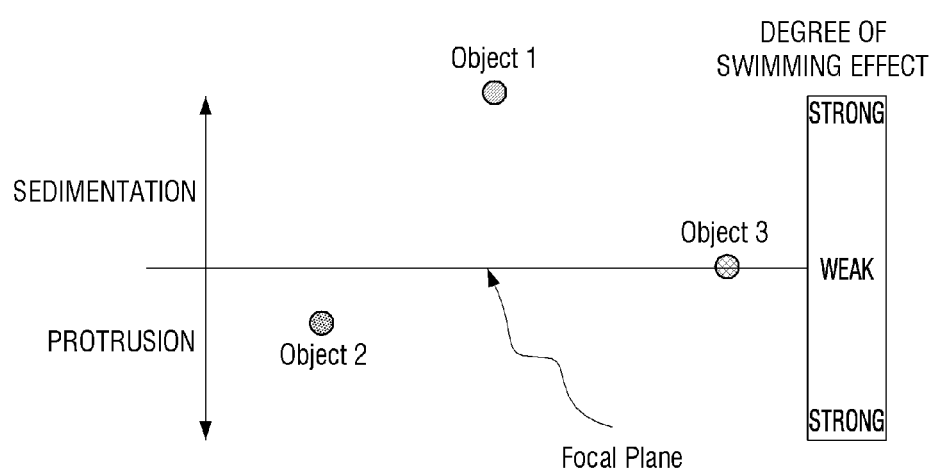
FIG. 4 is a view provided to explain a swim effect of a pseudo stereo section according to an exemplary embodiment.

FIG. 4 is a view provided to explain swim effect of a pseudo stereo section according to an exemplary embodiment.

The swim effect of the pseudo stereo section according to the aforementioned cyclic mapping method occurs by difference of depth of an object.

As illustrated in FIG. 4, the farther from the focal plane, that is, a screen surface, the more the degree of swim effect of each object increases.

In the illustrated example, swim effect of object 3 is the lowest, and that of object 1 is the greatest. That is, the strength of the swim effect decreases in an order of object 1, object 2, and object 3.

Figure 5A:
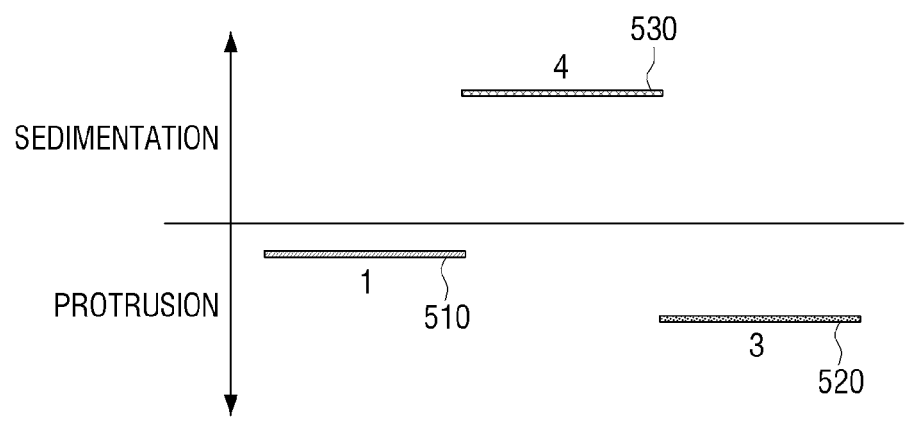
FIGS. 5A and 5B are views provided to explain a method for adjusting depth according to an exemplary embodiment.
Figure 5B:
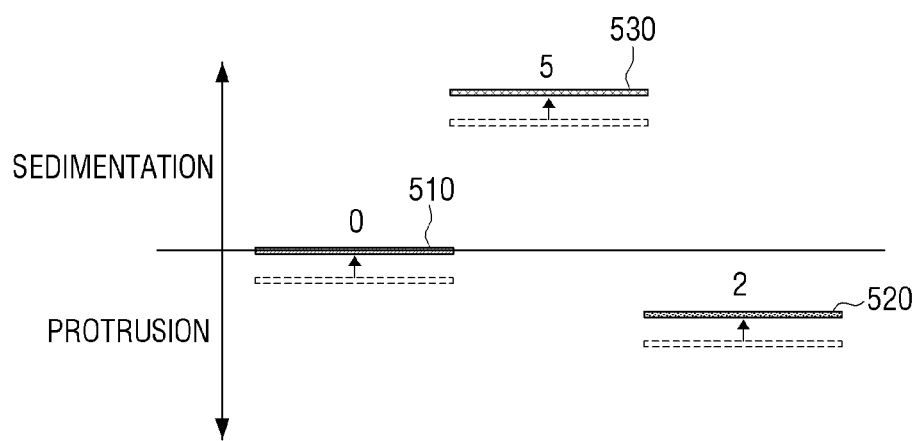

FIGS. 5A and 5B are views provided to explain a method for adjusting depth according to an exemplary embodiment.

As illustrated in FIG. 5B, it is assumed that each depth of three objects 510, 520, and 530 included in an input image is protrusion strength 1, protrusion strength 3, and sedimentation strength 4.

When a sum of a pixel size of the foreground objects 510 and 520 having protrusion strength is greater than a pixel size of the rear ground object 530 having sedimentation strength, depth of the objects 510, 520, and 530 may be shifted so that one of the foreground objects 510 and 520 having a greater pixel size can be arranged on a focal plane. For example, depth of the objects 510, 520, and 530 may be shifted so that the foreground object 510 having protrusion strength 1 can be arranged on a focal plane. In other words, the objects 510, 520, and 530 may be shifted by sedimentation strength 1. Accordingly, degree of swim effect on a screen is decreased.

In the aforementioned exemplary embodiment, a pixel size of each object 510, 520, and 530 is the same, and thus, to facilitate understanding, degree of swim effect may be calculated as a sum of depth. That is, degree of swim effect of the arrangement illustrated in FIG. 5A is 1+3+4=8. However, as illustrated in FIG. 5B, if depth of each object is shifted by sedimentation strength 1, entire swim effect becomes 0+2+5=7, and degree of swim effect is reduced.

Figure 6A:
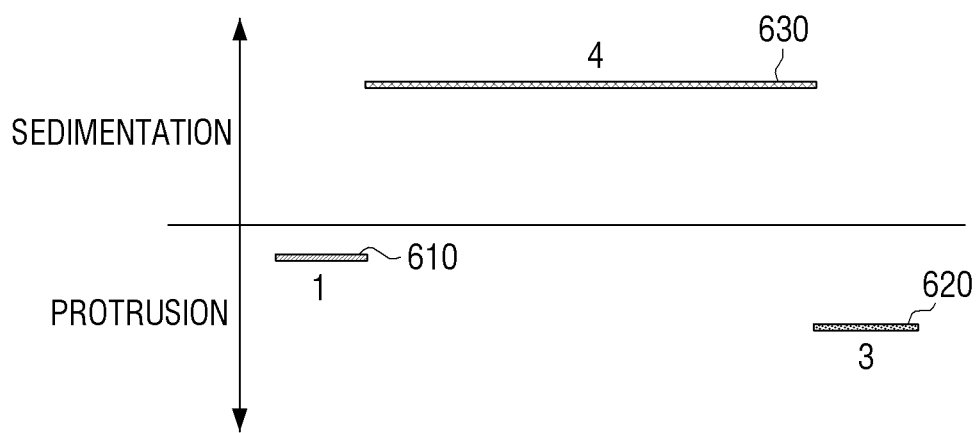
FIGS. 6A and 6B are views provided to explain a method for adjusting depth according to another exemplary embodiment.
Figure 6B:
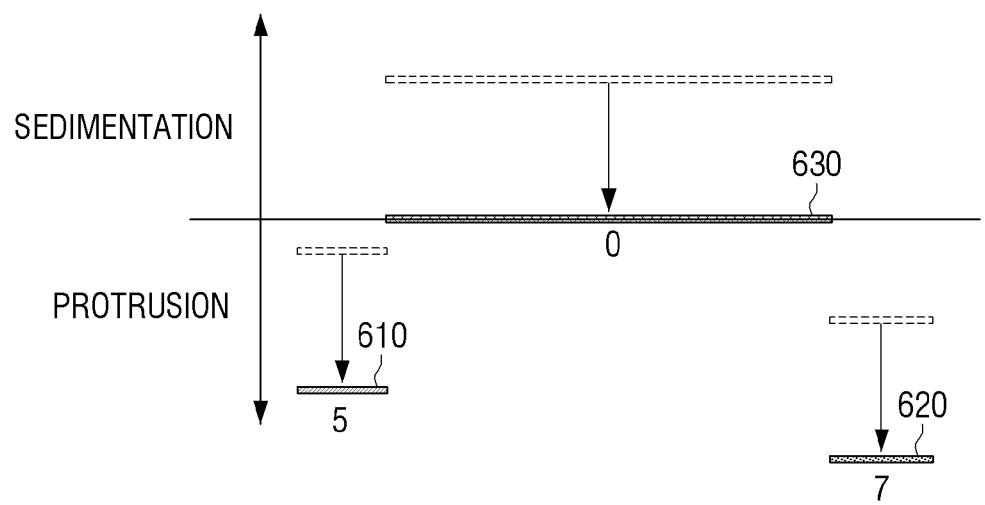

FIGS. 6A and 6B are views provided to explain a method for adjusting depth according to another exemplary embodiment.

As illustrated in FIG. 6A, it is assumed that each depth of the three objects 610, 620, and 630 included in an input image is protrusion strength 1, protrusion strength 3, and sedimentation strength 4.

When a sum of a pixel size of the foreground objects 610 and 620, each having a protrusion strength, is less than a pixel size of the rear ground object 630 having sedimentation strength, depth of the objects 610, 620, and 630 may be shifted so that the rear ground object 630 having a greater pixel size can be arranged on a focal plane. For example, depth of the objects 610, 620, and 630 may be shifted so that the rear ground object 630 having sedimentation strength 4 can be arranged on a focal plane. That is, the objects 610, 620, and 630 may be shifted by protrusion strength 4. Accordingly, degree of swim effect on a screen is decreased.

That is, as degree of swim effect which occurs at the rear ground object 630 which occupies a greater region is reduced, and thus, even though degree of swim effect which occurs at the foreground objects 610 and 620 which take a lesser region slightly increases, entire swim effect will be decreased.

Figure 7A:
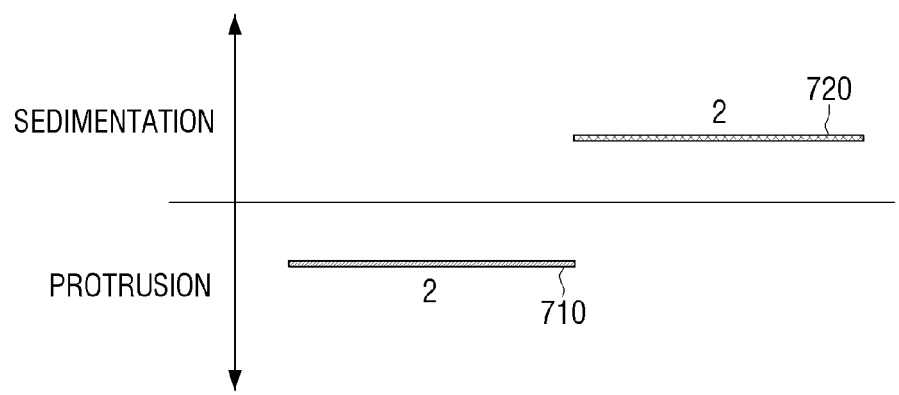
FIGS. 7A and 7B are views provided to explain a method for adjusting depth according to still another exemplary embodiment.
Figure 7B:
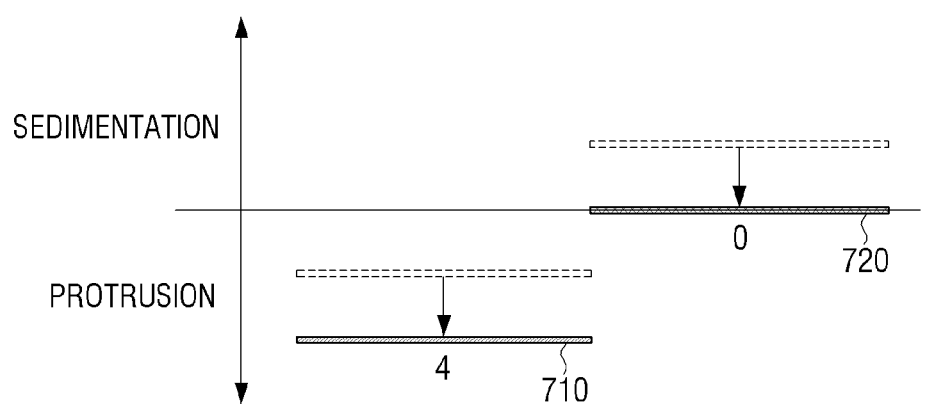

FIGS. 7A and 7B are views provided to explain a method for adjusting depth according to still another exemplary embodiment.

As illustrated in FIG. 7A, it has been assumed that two objects 710 and 720 included in an input image each has each depth of protrusion strength 2 and sedimentation strength 2.

When a pixel size of an object having a protrusion strength, that is the foreground object 710, is the same as a pixel size of an object having a sedimentation strength, that is the rear ground object 720, depth of the objects 710 and 720 may be shifted so as to arrange a rear ground object on a focal plane, as illustrated in FIG. 7B.

That is, in the 3D perception view, degree of swim effect by a rear ground object is more seriously perceived by a user. When a pixel size of a foreground object is the same as a pixel size of a rear ground object, depth may be shifted so as to arrange a rear ground object on a focal plane to reduce entire swim effect.

Figure 8A:
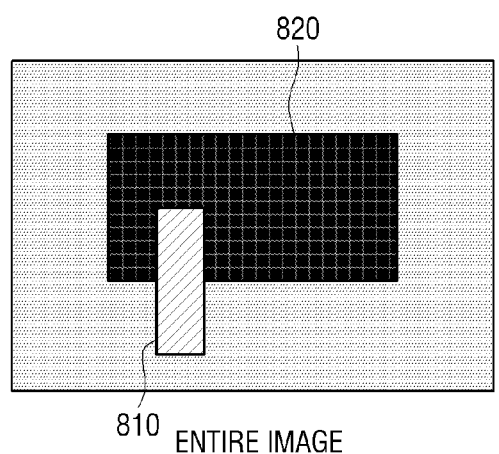
FIGS. 8A-8C are views provided to explain a method for adjusting depth according to an exemplary embodiment.
Figure 8A:
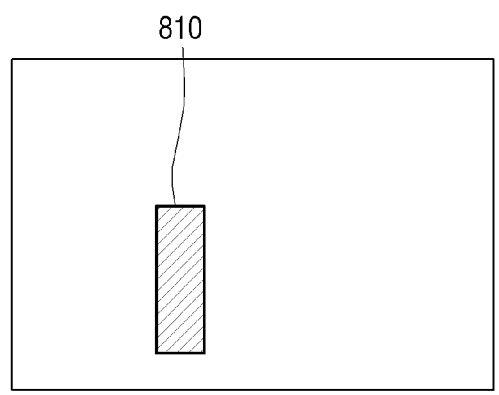
Figure 8A:
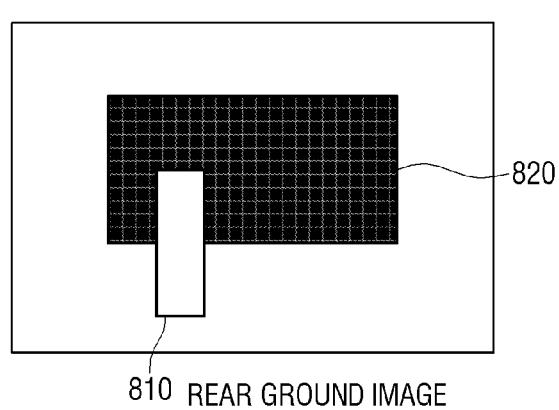
Figure 8B:
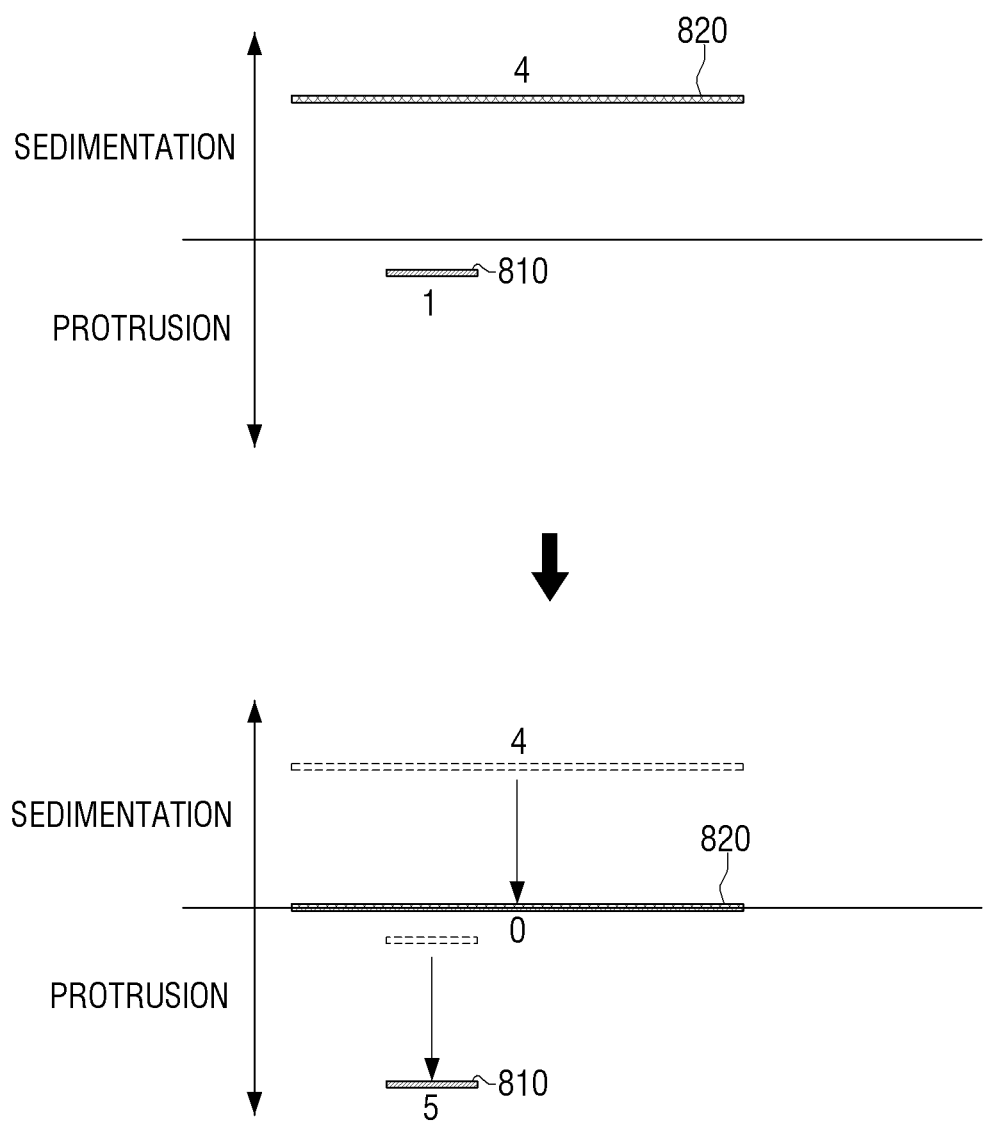
Figure 8C:
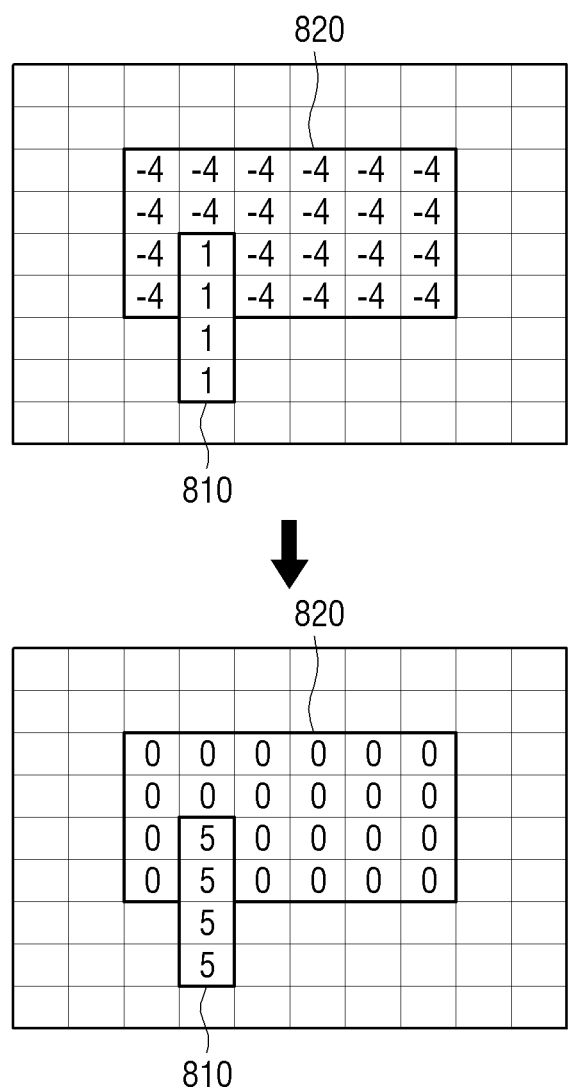

FIGS. 8A-8C are views provided to explain a method for adjusting depth by taking an example according to an exemplary embodiment.

As illustrated in FIG. 8A, a method for adjusting depth of an input image having the foreground object 810 and the rear ground object 820 will be explained.

As illustrated in FIG. 8B, when a pixel size of the rear ground object 820 is greater than a pixel size of the foreground object 810, depth of an object may be shifted to arrange the rear ground object 820 on a focal plane. In other words, as illustrated, the objects 810 and 820 may be shifted as much as protrusion strength 4 so that the rear ground object 820 having sedimentation strength 4 is arranged on a focal plane.

In this case, as illustrated in FIG. 8C, depth of a depth map is adjusted. In other words, as illustrated in FIG. 8C, a depth value of a pixel corresponding to the foreground object 810 may be adjusted from 1 to 5, and a depth value of a pixel corresponding to the rear ground object 820 may be adjusted from −4 to 0.

Figure 9:
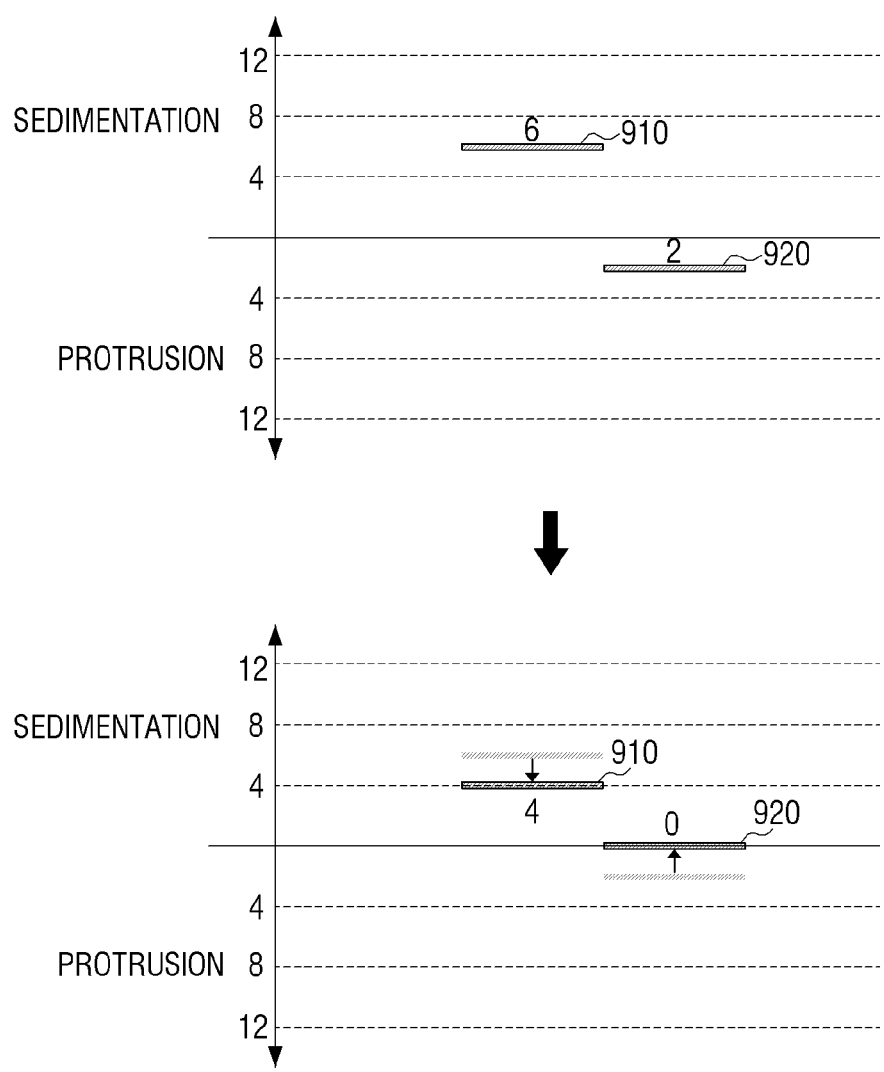
FIG. 9 is a view provided to explain a method for adjusting depth according to still another exemplary embodiment.

FIG. 9 is a view provided to explain a method for adjusting depth according to still another exemplary embodiment.

As illustrated in FIG. 9, based on information on each depth section which provides a view with the same cubic effect, depth of an object included in an input image may be adjusted.

For example, as illustrated in FIG. 9, it is assumed that a depth value of a section between 0 and 4 provides a viewer with the same cubic effect, a depth value of a section between 4 and 8 provides a viewer with the same cubic effect, and a depth value of a section between 8 and 12 provides a viewer with the same cubic effect.

In this case, the object 910 having sedimentation depth value 6 may be adjusted to a value closer to a focal plane at a depth section providing the same cubic effect, that is sedimentation depth value 4, and the object 920 having protrusion depth value 2 may be adjusted to a value closer to a focal plane at a depth section providing the same cubic effect, that is depth value 0. Accordingly, while providing the same cubic effect, swim effect is able to be reduced.

Meanwhile, the aforementioned figure is merely an example used for easier explanation, and information on a depth section providing the same cubic effect may be obtained through an experiment.

FIG. 10 is a flow chart provided to explain a method for displaying a multi-view image according to an exemplary embodiment.

According to a method for displaying a multi-view image illustrated in FIG. 10, depth of an input image is shifted and adjusted in which an object satisfying a preset criteria has a preset depth value based on depth information on at least one object included in an input image (S1010). Herein, the preset depth value may be a depth value corresponding to or relative to a focal plane in a depth map.

Based on a depth-adjusted image, rendering of a multi-view image is performed (S1020).

And then, a multi-view image is arranged as a preset arrangement pattern and displayed (S1030).

In addition, the adjusting the depth (S1010), based on a depth value of at least one object included in an input image and a size of a pixel region which an object occupies, may determine an object which satisfies a preset criteria.

To be specific, the adjusting the depth (S1010), when shifting depth of an input image where a certain object has a preset depth value, may determine an object which minimizes swim effect at a section where a multi-view image is arranged in reverse order at a preset arrangement pattern and where pseudo stereo occurs, as an object satisfying a preset criterion.

Moreover, the adjusting the depth (S1010), by comparing a pixel size of a rear ground object having a depth value less than a preset depth value from among at least one object with a pixel size of a foreground object having a depth value greater than a preset depth value, may include shifting depth of an input image so that an object having a greater pixel area is arranged on a focal plane.

In addition, the adjusting the depth (S1010), from among at least one object, when a pixel size of a rear ground object having a depth value less than a preset depth value is the same as a pixel size of a foreground object having a depth value greater than a preset depth value, may include shifting depth of an input image so that a rear ground object is arranged on a focal plane.

Herein, with respect to a preset arrangement pattern, the pattern may be a repeat of a pattern, where, when a multi-view image is an $N^{th}$ view, the $1^{st}$ view to the N/2th view may be arranged sequentially, and then the N/2−1th view to the $1^{st}$ view may be arranged in reverse order, or may be a repeat of a pattern where one view from among odd views or even views of the $1^{st}$ view to the Nth view is arranged sequentially, and then, the other view from among odd views or even views of the $1^{st}$ view to the Nth view is arranged in reverse order.

In addition, the storing information on each depth section which provides a viewer with the same cubic effect may be further included. The adjusting the depth (S1010), based on stored information, may include adjusting the depth of at least one object included in an input image as a depth value closer to a focal plane at a depth section providing the same cubic effect as at least one object.

According to the various exemplary embodiments, swim effect which may occur in accordance with an arrangement pattern of a multi-view image of a glasses-free display system may be reduced.

A method for displaying a multi-view image according to the aforementioned various exemplary embodiments may be realized as a program and provided to a display apparatus.

For example, there may be provided a non-transitory computer readable program where a program implements: adjusting depth by shifting depth of the input image so that an object satisfying a preset criterion has a preset depth value, based on depth information of at least one object included in the input image; performing rendering of a multi-view image based on the depth-adjusted image; and arranging and displaying the multi-view image as a preset arrangement pattern is stored.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as a compact disc (CD), digital versatile disc (DVD), hard disk, Blu-ray disk, universal serial bus (USB), memory card, and read-only memory (ROM) provided therein.

The foregoing embodiments are merely exemplary and are not to be construed as limiting the present invention. The present teaching can be readily applied to other types of apparatuses. Also, the description of the exemplary embodi-

What is claimed is:

1. A multi-view image display apparatus, comprising:
a depth adjuster configured to adjust depth of an input image;
a rendering unit configured to perform rendering of a multi-view based on the depth-adjusted image;
a display configured to arrange and display the multi-view image according to an arrangement pattern; and
a controller configured to control the depth adjuster to shift the depth of the input image so that a first object satisfying a criterion has a first depth value, based on depth information of at least two objects included in the input image, wherein the first object is one of the at least two objects,
wherein a second object from among the at least two objects is shifted based on an amount which said first object is shifted,
wherein the controller, based on information on each depth section providing a viewer with a same degree of three-dimensional effect, adjusts the depth of the first object included in the input image to the first depth value which is close to a focal plane at a depth section providing a same degree of three-dimensional effect as prior to said adjustment.

2. The apparatus as claimed in claim 1, wherein the first depth value is a preset depth value corresponding to a focal plane in a depth map.

3. The apparatus as claimed in claim 1, wherein the controller determines the first object satisfying the criterion based on a second depth value of at least one object from among the at least two objects included in the input image and a size of a pixel region which the first object occupies.

4. The apparatus as claimed in claim 2, further comprising:
a storage configured to store the information on each depth section providing the viewer with the same degree of three-dimensional effect.

5. The apparatus as claimed in claim 1, wherein at least one from among the criterion and the arrangement pattern is preset.

6. A multi-view image display apparatus, comprising:
a depth adjuster configured to adjust depth of an input image;
a rendering unit configured to perform rendering of a multi-view based on the depth-adjusted image;
a display configured to arrange and display the multi-view image according to an arrangement pattern; and
a controller configured to control the depth adjuster to shift the depth of the input image so that a first object satisfying a criterion has a first depth value, based on depth information of at least two objects included in the input image, wherein the first object is one of the at least two objects,
wherein a second object from among the at least two objects is shifted based on an amount which said first object is shifted,
wherein the controller determines the first object satisfying the criterion based on a second depth value of at least one object from among the at least two objects included in the input image and a size of a pixel region which the first object occupies, and
wherein the controller shifts depth of the input image so that an object, from among the at least two objects, having a greater pixel size is arranged on a focal plane by comparing a first pixel size of a rear ground object having a third depth value less than the first depth value with a second pixel size of a foreground image having a fourth depth value greater than the first depth value.

7. A multi-view image display apparatus, comprising:
a depth adjuster configured to adjust depth of an input image;
a rendering unit configured to perform rendering of a multi-view based on the depth-adjusted image;
a display configured to arrange and display the multi-view image according to an arrangement pattern; and
a controller configured to control the depth adjuster to shift the depth of the input image so that a first object satisfying a criterion has a first depth value, based on depth information of at least two objects included in the input image, wherein the first object is one of the at least two objects,
wherein a second object from among the at least two objects is shifted based on an amount which said first object is shifted,
wherein the controller determines the first object satisfying the criterion based on a second depth value of at least one object from among the at least two objects included in the input image and a size of a pixel region which the first object occupies, and
wherein when a first pixel size of a rear ground object, from among the at least two objects, having a third depth value less than the first depth value is the same as a second pixel size of a foreground image having a fourth depth value greater than the first depth value, the controller shifts the depth of the input image so that the rear ground object is arranged on a focal plane.

8. A multi-view image display apparatus, comprising:
a depth adjuster configured to adjust depth of an input image;
a rendering unit configured to perform rendering of a multi-view based on the depth-adjusted image;
a display configured to arrange and display the multi-view image according to an arrangement pattern; and
a controller configured to control the depth adjuster to shift the depth of the input image so that a first object satisfying a criterion has a first depth value, based on depth information of at least one object included in the input image,
wherein when the depth of the input image is shifted so that a second object has a second depth value, the controller determines an object in which swim effect is minimized at a section where the multi-view image is arranged in reverse order of the arrangement pattern, and where pseudo stereo occurs, as the first object satisfying the criterion.

9. The apparatus as claimed in claim 8, wherein, when the multi-view image is a total of N views, the arrangement pattern is a repeat of a pattern where $1^{st}$ view to N/2th view are arranged sequentially and then N/2−1th view to $1^{st}$ view are arranged in reverse order, or a repeat of a pattern where one view from among odd views and even views of $1^{st}$ view to Nth view is arranged sequentially and then the other remaining view from among odd views and even views of Nth view to $1^{st}$ view is arranged in reverse order.

10. A method for displaying a multi-view image of a multi-view image apparatus, the method comprising:
adjusting depth, by a controller of the multi-view image apparatus, by shifting depth of an input image so that a first object satisfying a criterion has a first depth value, based on depth information of at least two objects included in the input image, wherein the first object is one of the at least two objects;

performing rendering of a multi-view image based on the depth-adjusted image; and arranging and displaying the multi-view image as an arrangement pattern, wherein a second object from among the at least two objects is shifted based on an amount which said first object is shifted, and wherein the adjusting the depth comprises, based on information on each depth section providing a viewer with a same degree of three-dimensional effect, adjusting the depth of the first object included in the input image to the first depth value which is close to a focal plane at a depth section providing a same degree three-dimensional effect as prior to said adjustment.

11. The method as claimed in claim 10, wherein the first depth value is a preset depth value corresponding to the focal plane in a depth map.

12. The method as claimed in claim 10, wherein the adjusting the depth comprises determining the first object satisfying the criterion based on a second depth value of at least one object from among the at least two objects included in the input image and a size of a pixel region which the first object occupies.

13. The method as claimed in claim 10, wherein at least one from among the criterion and the arrangement pattern is preset.

14. A method for displaying a multi-view image of a multi-view image apparatus, the method comprising:

adjusting depth, by a controller of the multi-view image apparatus, by shifting depth of an input image so that a first object satisfying a criterion has a first depth value, based on depth information of at least two objects included in the input image, wherein the first object is one of the at least two objects;

performing rendering of a multi-view image based on the depth-adjusted image; and arranging and displaying the multi-view image as an arrangement pattern, wherein a second object from among the at least two objects is shifted based on an amount which said first object is shifted, wherein the adjusting the depth comprises determining the first object satisfying the criterion based on a second depth value of at least one object from among the at least two objects included in the input image and a size of a pixel region which the first object occupies, and wherein the adjusting the depth comprises, from among the at least two objects, shifting depth of the input image so that an object having a greater pixel size is arranged on a focal plane, by comparing a first pixel size of a rear ground object having a third depth value less than the first depth value with a second pixel size of a foreground image having a fourth depth value greater than the first depth value.

15. A method for displaying a multi-view image of a multi-view image apparatus, the method comprising:

adjusting depth, by a controller of the multi-view image apparatus, by shifting depth of an input image so that a first object satisfying a criterion has a first depth value, based on depth information of at least two objects included in the input image, wherein the first object is one of the at least two objects;

performing rendering of a multi-view image based on the depth-adjusted image; and arranging and displaying the multi-view image as an arrangement pattern, wherein a second object from among the at least two objects is shifted based on an amount which said first object is shifted, wherein the adjusting the depth comprises determining the first object satisfying the criterion based on a second depth value of at least one object from among the at least two objects included in the input image and a size of a pixel region which the first object occupies, and wherein the adjusting the depth comprises, when a first pixel size of a rear ground object, from among the at least two objects, having a third depth value less than the first depth value is the same as a second pixel size of a foreground image having a fourth depth value greater than the first depth value, shifting depth of the input image so that the rear ground object is arranged on a focal plane.

16. A method for displaying a multi-view image of a multi-view image apparatus, the method comprising:

adjusting depth, by a controller of the multi-view image apparatus, by shifting depth of an input image so that a first object satisfying a criterion has a first depth value, based on depth information of at least two objects included in the input image, wherein the first object is one of the at least two objects;

performing rendering of a multi-view image based on the depth-adjusted image; and arranging and displaying the multi-view image as an arrangement pattern, wherein a second object from among the at least two objects is shifted based on an amount which said first object is shifted, and wherein the adjusting the depth comprises, when depth of the input image is shifted so that a second object has a second depth value, determining an object in which swim effect is minimized at a section where the multi-view image is arranged in reverse order at the arrangement pattern and where pseudo stereo occurs, as the first object satisfying the criterion.

17. The method as claimed in claim 16, wherein, when the multi-view image is a total of N views, the arrangement pattern is a repeat of a pattern where $1^{st}$ view to N/2th view are arranged sequentially and then N/2−1th view to $1^{st}$ view are arranged in reverse order, or a repeat of a pattern where one view from among odd views and even views of $1^{st}$ view to Nth view is arranged sequentially and then the other remaining view from among odd views and even views of Nth view to $1^{st}$ view is arranged in reverse order.

18. A multi-view image display apparatus, comprising:

a depth adjuster configured to adjust depth of an input image;

a rendering unit configured to perform rendering of a multi-view based on the depth-adjusted image;

a display configured to arrange and display the multi-view image;

and a controller configured to determine which first object from among a plurality of objects of the input image to shift toward a focal plane and control the depth adjuster to shift a depth of the first object and shift a second object from among the plurality of objects based on the shifting of the first object, wherein the second object is shifted based on an amount which the first object is shifted, and wherein the controller, based on information on each depth section providing a viewer with a same degree of three-dimensional effect, adjusts the depth of the first object included in the input image to the first depth value which is close to the focal plane at a depth section providing a same degree of three-dimensional effect as prior to said adjustment.

* * * * *